US011093705B2

(12) United States Patent
Lee et al.

(10) Patent No.: US 11,093,705 B2
(45) Date of Patent: Aug. 17, 2021

(54) APPARATUS AND METHOD OF VERIFYING SIMULTANEOUS EDIT MATCH FOR MARKUP LANGUAGE-BASED DOCUMENT

(71) Applicant: HANCOM INC., Seongnam-si (KR)

(72) Inventors: Taeju Lee, Yongin-si (KR); Yongkyung Oh, Yongin-si (KR); Kyury Kim, Seoul (KR)

(73) Assignee: HANCOM INC., Seongnam-si (KR)

( * ) Notice: Subject to any disclaimer, the term of this patent is extended or adjusted under 35 U.S.C. 154(b) by 187 days.

(21) Appl. No.: 15/516,677

(22) PCT Filed: Jun. 27, 2016

(86) PCT No.: PCT/KR2016/006870
§ 371 (c)(1),
(2) Date: Apr. 4, 2017

(87) PCT Pub. No.: WO2018/004020
PCT Pub. Date: Jan. 4, 2018

(65) Prior Publication Data
US 2018/0267944 A1 Sep. 20, 2018

(51) Int. Cl.
*G06F 40/197* (2020.01)
*G06F 16/93* (2019.01)
(Continued)

(52) U.S. Cl.
CPC ............ *G06F 40/197* (2020.01); *G06F 16/93* (2019.01); *G06F 40/143* (2020.01); *G06F 40/166* (2020.01)

(58) Field of Classification Search
CPC .......... G06F 17/24; G06F 17/25; G06T 11/60; A63F 2300/5553; A63F 2300/6623
(Continued)

(56) References Cited

U.S. PATENT DOCUMENTS 7,769,810 B1 8/2010 Kaufman
2012/0101980 A1 4/2012 Taleghani et al.
(Continued)

FOREIGN PATENT DOCUMENTS

KR 10-2014-0147093 A1 12/2014
KR 10-2015-0135055 A 12/2015
(Continued)

OTHER PUBLICATIONS

Screen captures from YouTube video clip entitled "Google Docs in Plain English," 7 pages, published and uploaded on Sep. 11, 2007 by Google. Retrieved from Internet: https://www.youtube.com/watch?v=eRqUE6IHTEA (Year: 2007).*
(Continued)

*Primary Examiner* — Kavita Stanley
*Assistant Examiner* — Jenq-Kang Chu
(74) *Attorney, Agent, or Firm* — Park, Kim & Suh, LLC

(57) ABSTRACT

An apparatus and a method of verifying a simultaneous edit match for a markup language-based document according to the present invention simultaneously apply a predetermined edit command set to a markup language-based document through simultaneous edit sessions, compare tags of the markup language-based documents, which are completely edited in respective edit sessions, and determine whether the tags of both documents are matched to each other, to assist a developer to determine whether a currently operated simultaneous edit support algorithm of a document normally supports a simultaneous edit according to edit commands included in the corresponding edit command set.

6 Claims, 3 Drawing Sheets

(51) Int. Cl.
*G06F 40/166* (2020.01)
*G06F 40/143* (2020.01)
(58) Field of Classification Search
USPC .............................. 715/201, 202, 230, 255
See application file for complete search history.

(56) References Cited

U.S. PATENT DOCUMENTS

| | | | | |
|---|---|---|---|---|
| 2012/0117457 | A1* | 5/2012 | Yuniardi | G06F 40/197 715/229 |
| 2014/0129645 | A1 | 5/2014 | Mo | |
| 2015/0120654 | A1* | 4/2015 | Shan | G06F 17/2235 707/610 |
| 2015/0199317 | A1* | 7/2015 | Lemonik | G06F 9/44526 715/255 |
| 2015/0199318 | A1* | 7/2015 | Lemonik | G06F 9/44526 715/255 |
| 2015/0199319 | A1* | 7/2015 | Newman | G06F 17/2211 715/255 |
| 2015/0341399 | A1 | 11/2015 | Lee | |
| 2017/0017779 | A1* | 1/2017 | Huang | G06F 40/106 |
| 2019/0147402 | A1* | 5/2019 | Sitrick | H04N 7/15 705/301 |

FOREIGN PATENT DOCUMENTS

| | | |
|---|---|---|
| WO | 2009/079116 A2 | 6/2009 |
| WO | 2009/145941 A1 | 12/2009 |
| WO | 2013/148382 A1 | 10/2013 |

OTHER PUBLICATIONS

Korean Office Action in Appln. No. 10-2017-7000807 dated Feb. 19, 2017 with English translation, 11pages.
International Search Report in International Application No. PCT/KR2016/006870 dated Mar. 27, 2017 with English translation, 5pages.

* cited by examiner

APPARATUS AND METHOD OF VERIFYING SIMULTANEOUS EDIT MATCH FOR MARKUP LANGUAGE-BASED DOCUMENT

CROSS-REFERENCE TO RELATED APPLICATIONS

This application is the National Stage filing under 35 U.S.C. 371 of International Application No. PCT/KR2016/006870, filed on Jun. 27, 2016, the contents of which are all hereby incorporated by reference herein in their entirety.

TECHNICAL FIELD

The present invention relates to a method of verifying a match for supporting a simultaneous edit of a markup language-based document between a plurality of users.

BACKGROUND ART

Recently, according to the wide supply of electronic terminal devices, such as a computer, a smart phone, or a tablet PC, various kinds of electronic document-related programs, with which a user may read, write, and edit an electronic document by using the electronic terminal device, have been released.

The electronic document-related programs include a word processor supporting basic writing and editing of a document, a spread sheet assisting data input, calculation, and a data management, and presentation programs assisting a presentation of a speaker.

In the related art, in order for a user to read, write, and edit an electronic document by utilizing an electronic terminal device, the user needs to directly install the electronic document-related programs in the electronic terminal device, drive the electronic document-related programs, and read or write and edit the electronic document.

However, recently, a high speed Internet environment is established and a wireless Internet environment, in which a user is capable of accessing the Internet anytime and anywhere, is established, and an electronic document-related service is provided to an electronic terminal device that is a client terminal through a server in a remote place, so that a web-based electronic document service, which enables a user to read, write, and edit an electronic document anytime and anywhere even though the user does not install a predetermined electronic document-related program in an electronic terminal device, appears.

The web-based electronic document service supports various client terminals to access an electronic document service providing server, and then to read, write, and edit an electronic document based on a markup language through a browser installed in the client terminals, and supports various client terminals to act simultaneous cooperation in real time for the electronic document, so that the web-based electronic document service is mainly utilized in a company, a group, and the like.

The web-based electronic document service supports a user to read, write, and edit an electronic document through a browser installed in a client terminal if the client terminal can access the Internet, without a necessity for installing a predetermined electronic document writing program in the client terminal, so that it is possible to secure mobility for a user, thereby gradually increasing individual users.

There are many cases where the web-based electronic document service provides a cooperation function, which enables the plurality of users to perform an edit of one markup language-based document at the same time.

When the plurality of users performs the edit of one markup language-based document at the same time, a conflict may be incurred between editing commands input from the respective users, and there is a technology called operational transformation as a technology for preventing the conflict.

The operational transformation is a method, in which when the plurality of users edits one document at the same time, even though the corresponding simultaneous edit generates a conflict between the incompatible editing commands in the document, the conflict is solved and a reflection position of each editing command in the document and the like are adjusted so that all of the editing commands are reflected in the document.

For example, it is assumed that there exists a document, in which text "abc" is inserted, and user 1 and user 2 generate edit sessions for the document through their client terminals, and user 1 performs an edit of inserting "e" between "ab" and "c" through his/her client terminal and user 2 performs an edit of deleting "c" at the same time.

In this case, the operational transformation technology is a technology, which simultaneously reflects the edits generated from the client terminal of user 1 and the client terminal of user 2 to a document existing in the edit session of the client terminal of user 1 and a document existing in the edit session of the client terminal of user 2 and helps the document existing in the edit session of the client terminal of user 1 and the document existing in the edit session of the client terminal of user 2 to be maintained in the same edit state of "abe" to support the simultaneous edit of the document.

As a result, the operational transformation technology is the technology, which when a plurality of users accesses one shared document, generates edit sessions for the edit of the document, and edits the document in the respective edit sessions, and always maintains the documents in the edit sessions generated by the plurality of users to be in the same state to support the real-time simultaneous edit of the document, and is the technology, in which users share edit commands generated by the edit sessions of the respective users through a network, then reflection positions for the edit commands of the respective users in the document are appropriately converted according to situations and are reflected to the document to always maintain the documents in the edit sessions of the respective users to be in the same state.

When the web-based electronic document service uses the operational transformation technology, there is a useful advantage in that it is possible to support a real-time cooperation for the document, but it is not actually easy to form an operational transformation algorithm for removing a conflict between all of the edit commands generated by the users.

Accordingly, there is a need for research on a method for supporting a new operational transformation algorithm, in which on an assumption that in the web-based electronic document service, a plurality of users simultaneously edits one document, a match for whether the documents edited in edit sessions of the respective users are maintained in the same state is verified and the match verification result is collected to enable a developer to confirm whether a conflict is generated when specific edit commands are generated by the plurality of users at the same time, and solve the conflict.

SUMMARY OF THE INVENTION

Technical Problem

The present invention has been made in an effort to provide an apparatus and a method of verifying a simultaneous edit match for a markup language-based document, which simultaneously apply a predetermined edit command set to a markup language-based document through simultaneous edit sessions, compare tags of the markup language-based documents, which are completely edited in respective edit sessions, and determine whether the tags of both documents are matched to each other, to support a developer to determine whether a currently operated simultaneous edit support algorithm of a document normally supports a simultaneous edit according to edit commands included in the corresponding edit command set.

Technical Solution

An exemplary embodiment of the present invention provides an apparatus for verifying a simultaneous edit match for a markup language-based document, the apparatus including: an edit session generating unit configured to generate n document edit sessions, which enable n virtual users to simultaneously edit a first markup language-based document through a browser (n is a natural number equal to or larger than 2); a simultaneous edit performing unit configured to simultaneously apply predetermined n different edit commands to the first markup language-based document through the n document edit sessions and simultaneously edit the first markup language-based document to generate the first markup language-based document, which is completely edited in each of the n document edit sessions; and a document match determining unit configured to compare tags of the first markup language-based documents, which are completely edited in the respective n document edit sessions, and determine whether the tags of the first markup language-based documents, which are completely edited in the respective n document edit sessions, are matched to each other.

Another exemplary embodiment of the present invention provides a method of verifying a simultaneous edit match for a markup language-based document, the method including: generating n document edit sessions, which enable n virtual users to simultaneously edit a first markup language-based document through a browser (n is a natural number equal to or larger than 2); simultaneously applying predetermined n different edit commands to the first markup language-based document through the n document edit sessions and simultaneously editing the first markup language-based document to generate the first markup language-based document, which is completely edited in each of the n document edit sessions; and comparing tags of the first markup language-based documents, which are completely edited in the respective n document edit sessions, and determining whether the tags of the first markup language-based documents, which are completely edited in the respective n document edit sessions, are matched to each other.

Advantageous Effects

The apparatus and the method of verifying the simultaneous edit match for the markup language-based document according to the present invention may simultaneously apply a predetermined edit command set to a markup language-based document through simultaneous edit sessions, compare tags of the markup language-based documents, which are completely edited in respective edit sessions, and determine whether the tags of both documents are matched to each other, to assist a developer to determine whether a currently operated simultaneous edit support algorithm of a document normally supports a simultaneous edit according to edit commands included in the corresponding edit command set.

DETAILED DESCRIPTION

Figure 1:
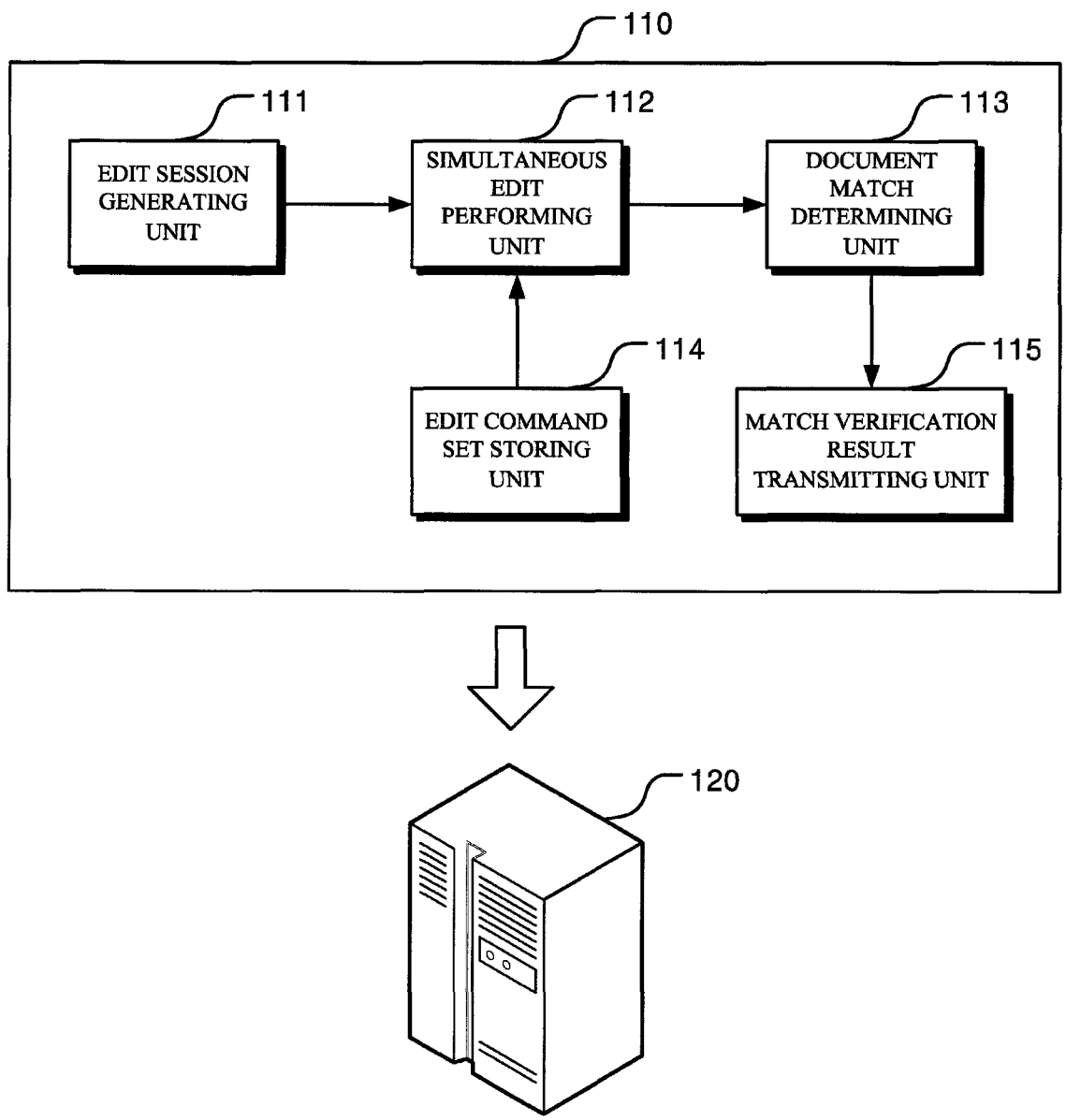
FIG. 1 is a diagram illustrating a structure of a simultaneous edit match verifying apparatus for a markup language-based document according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

In the case where a component is referred to as being "connected" or "accessed" to other components, it should be understood that the component may not only be directly connected or accessed to the other component, but also there may exist another component between them. In contrast, when one element is "directly coupled to" or "directly connected to" another element, it should be understood that there is no intervening element present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, constituent elements, and elements described in the specification or a combination thereof, and do not exclude a possibility of the existence or addition of one or more other characteristics, numbers, steps, operations, constituent elements, and elements, or a combination thereof in advance.

All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present application.

Hereinafter, exemplary embodiments of the present invention will be described in detail with reference to the accompanying drawings.

FIG. 1 is a diagram illustrating a structure of a simultaneous edit match verifying apparatus for a markup language-based document according to an exemplary embodiment of the present invention.

Referring to FIG. 1, a simultaneous edit match verifying apparatus 110 for a markup language-based document according to an exemplary embodiment of the present invention includes an edit session generating unit 111, a simultaneous edit performing unit 112, and a document match determining unit 113.

Here, the markup language-based document means a document formed of a markup language, such as a hypertext markup language (HTML) or an eXtensible markup language (XML).

The edit session generating unit 111 generates n document edit sessions, which enable n virtual users to simultaneously edit a first markup language-based document through a browser (n is a natural number equal to or larger than 2).

Figure 2:
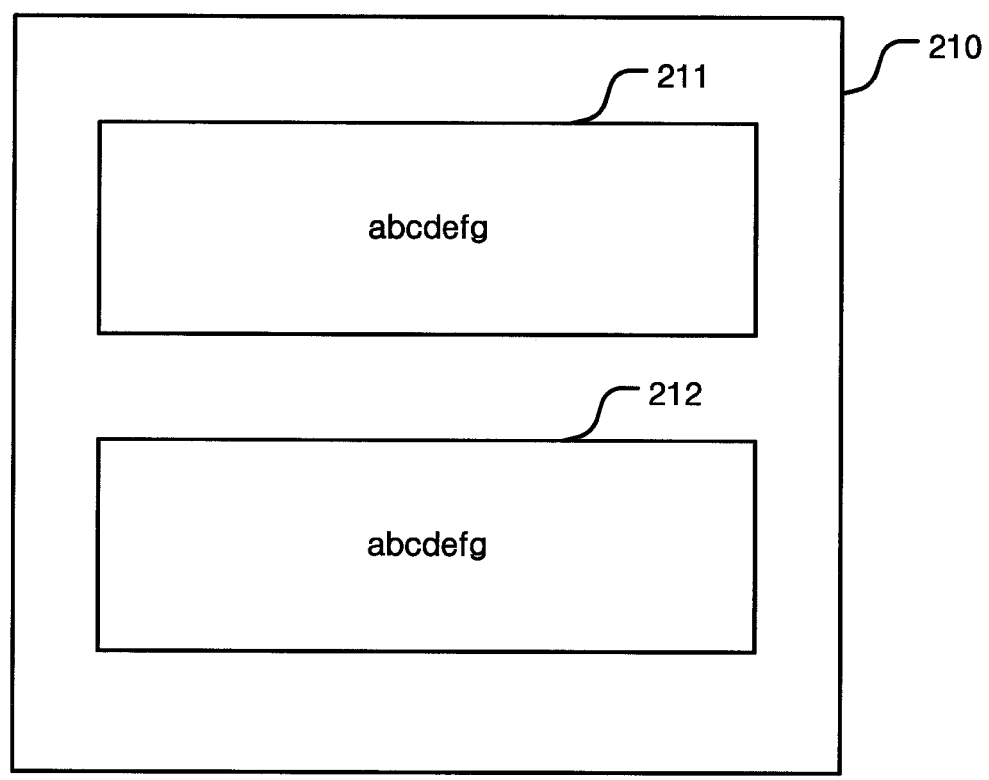
FIG. 2 is a diagram for describing a simultaneous edit match verifying apparatus for a markup language-based document according to an exemplary embodiment of the present invention.

For example, when it is assumed that n is 2, and the first markup language-based document is a document, into which text "abcdefg" is inserted, as illustrated in FIG. 2, the edit session generating unit 111 may generate two document edit sessions 211 and 212, which enable the two users to simultaneously edit the first markup language-based document through a browser, as illustrated in FIG. 2.

That is, when a screen denoted by reference numeral 210 is a screen displayed through the browser, the edit session generating unit 111 may generate document edit session 1 211 and document edit session 2 212, and may display an image for the document edit session 1 211 and an image for the document edit session 2 212 on the browser screen 210 at the same time as illustrated in FIG. 2.

The simultaneous edit performing unit 112 may simultaneously apply predetermined n different edit commands to the first markup language-based document through the n document edit sessions and simultaneously edit the first markup language-based document to generate the first markup language-based document, which is completely edited in each of the n document edit sessions.

In relation to this, an operation of the simultaneous edit performing unit 112 will be described by using the example of FIG. 2. The simultaneous edit performing unit 112 may simultaneously apply two predetermined different edit commands to the first markup language-based document through the two document edit sessions 211 and 212 and simultaneously edit the first markup language-based document to generate the first markup language-based document, which is completely edited in each of the two document edit sessions 211 and 212.

For example, when the two predetermined different edit commands are edit command 1 commanding to delete "c" from "abcdefg" and edit command 2 commanding to insert "3" between "c" and "d" in "abcdefg", the simultaneous edit performing unit 112 may simultaneously edit the first markup language-based document by applying the edit command 1 to the document edit session 1 211 and simultaneously applying the edit command 2 to the document edit session 2 212 to generate the first markup language-based document, which is completely edited in each of the document edit sessions 1 and 2 211 and 212.

In this case, in order to simultaneously reflect the edit command 1 applied through the document edit session 1 211 and the edit command 2 applied through the document edit session 2 212 to the currently edited first markup language-based document through the document edit sessions 1 and 2 211 and 212, respectively, the simultaneous edit performing unit 112 may perform an operational transformation for the edit commands 1 and 2 in the document edit sessions 1 and 2 211 and 212, respectively, to generate the first markup language-based document, which is completely edited in each of the document edit sessions 1 and 2 211 and 212.

The document match determining unit 113 compares tags of the first markup language-based documents, which are completely edited in the respective n document edit sessions, and determines whether the tags of the first markup language-based documents, which are completely edited in the respective n document edit sessions, are matched.

That is, an operation of the document match determining unit 113 will be described by using the aforementioned example. When the reflection of the edit to the first markup language-based document in each of the document edit sessions1 and 2 211 and 212 is completed, the document match determining unit 113 compares a tag of the first markup language-based document, which is completely edited in the document edit session 1 211 and a tag of the first markup language-based document, which is completely edited in the document edit session 2 212, and when it is determined that the tags of both documents are matched to each other, the document match determining unit 113 may determine that the edit command 1 and the edit command 2 as an edit command set, which is usable to simultaneously edit the document even though a conflict is generated between both edit commands, because the first edit command 1 and the edit command 2 are simultaneously applied to the first markup language-based document, and when it is determined that the tags of both documents are not matched to each other, the document match determining unit 113 may determine that it is impossible to support the simultaneous edit for the edit command 1 and the edit command 2 yet and there is a need for an additional development for implementing an operational transformation logic or a document edit function.

As a result, the simultaneous edit match verifying apparatus 110 for the markup language-based document may simultaneously apply a predetermined edit command set to a markup language-based document through simultaneous edit sessions, compare tags of the markup language-based documents, which are completely edited in the respective edit sessions, and determine whether the tags of both documents are matched to each other, to assist a developer to determine whether a simultaneous edit support algorithm of a currently operated document normally supports a simultaneous edit according to edit commands included in the corresponding edit command set.

According to the exemplary embodiment of the present invention, the simultaneous edit match verifying apparatus 110 for the markup language-based document further includes an edit command set storing unit 114, which stores a plurality of edit command sets formed of edit commands predetermined for testing whether the simultaneous edit is available, to determine whether it is possible to support the simultaneous edit for each of the plurality of edit command sets.

In relation to this, the edit command set storing unit 114 stores the plurality of edit command sets including n predetermined different edit commands, which may be simultaneously applied from n users for one markup language-based document.

For example, when it is assumed that "n" is "2", the edit command set storing unit 114 may store information represented in Table 1 below.

TABLE 1

| Plurality of edit command sets | Two predetermined different edit commands |
| --- | --- |
| Edit command set 1 | Edit command 1, Edit command 2 |
| Edit command set 2 | Edit command 3, Edit command 4 |
| Edit command set 3 | Edit command 5, Edit command 6 |
| ... | ... |

In this case, the simultaneous edit performing unit 112 may simultaneously apply the n different edit commands included in each of the plurality of edit command sets to the first markup language-based document through the n document edit sessions for each of the plurality of edit command sets and simultaneously edit the first markup language-based document to generate the first markup language-based document, which is completely edited in each of the n document edit sessions.

The document match determining unit 113 may compare tags of the first markup language-based documents, which are completely edited in the respective n document edit sessions, and determine whether the tags of the first markup language-based documents, which are completely edited in the respective n document edit sessions, are matched to each other, for each of the plurality of edit command sets.

For example, when it is assumed that "n" is "2" and the information represented in Table 1 is stored in the edit command set storing unit 114, the edit session generating unit 111 may generate two document edit sessions enabling two virtual users to simultaneously edit the first markup language-based document through the browser.

The simultaneous edit performing unit 112 may first simultaneously apply "edit command 1" and "edit command 2" included in "edit command set 1" to the first markup language-based document through the two document edit sessions and simultaneously edit the first markup language-based document to generate the first markup language-based document, which is completely edited in each of the two document edit sessions.

The document match determining unit 113 may compare tags of the first markup language-based documents, which are completely edited in the two document edit sessions, respectively, for each of the plurality of edit command sets, and determine whether the tags of the first markup language-based documents, which are completely edited in the two document edit sessions, respectively, are matched to each other.

Then, the simultaneous edit performing unit 112 may simultaneously edit the first markup language-based document by simultaneously applying "edit command 3" and "edit command 4" included in the "edit command set 2" to the first markup language-based document through the two document edit sessions again to generate the first markup language-based documents, which are completely edited in the two document edit sessions, and the document match determining unit 113 may compare the tags of the first markup language-based documents, which are completely edited in the two document edit sessions, and determine whether the tags of the first markup language-based documents, which are completely edited in the two document edit sessions, are matched to each other.

By the method, the simultaneous edit performing unit 112 and the document match determining unit 113 may simultaneously edit the first markup language-based document according to each of the edit commands for each of the plurality of edit command sets represented in Table 1, and determine whether to support the simultaneous edit for the edit commands included in each edit command set for each of the plurality of edit command sets through the comparison of the tags of the documents based on the edition.

In this case, according to the exemplary embodiment of the present invention, the simultaneous edit performing unit 112 may perform the operational transformation for simultaneously reflecting the n different edit commands included in each of the plurality of edit command sets to the first markup language-based document for each of the n document edit sessions, and generate the first markup language-based document, which is completely edited in each of the n document edit sessions.

In this case, according to the exemplary embodiment of the present invention, the simultaneous edit performing unit 112 may first reflect a first edit command input through a document edit session of the first edit command among the n different edit commands included in each of the plurality of edit command sets to the first markup language-based document and perform a first document edit for each of the n document edit sessions, convert a position in the first markup language-based document, to which the remaining edit commands input through other document edit sessions are to be applied, based on a change in a position of one or more objects existing in the first markup language-based document changed according to the first edit command and reflect the remaining edit commands to the first markup language-based document, of which the first document edit is completed, according to the changed position to generate the first markup language-based document, which is completely edited in each of the n document edit sessions.

Here, the one or more objects mean contents, such as text, an image, and a figure existing in a document, inserted into the first markup language-based document.

Hereinafter, the present invention will be described in detail based on a process of reflecting, by the simultaneous edit performing unit 112, the edit to the first markup language-based document through the operational transformation for each of the edit commands for each of the n document edit sessions as an example.

First, as illustrated in FIG. 2, it is assumed that text "abcdefg" is inserted into the first markup language-based document, the edit session generating unit 111 generates the document edit session 1 211 and the document edit session 2 212 because n is "2", edit command A, by which "e" is inserted between "a" and "b", is input in the document edit session 1 211 and edit command B, by which "c" is deleted, is input in the document edit session 2 212.

In this case, when a coordinate value of each position of the text "abcdefg" is defined as "0, 1, 2, 3, 4, 5, and 6" from a left side in a right direction, the edit command A input in the document edit session 1 211 may be defined as the edit command commanding to insert "e" to the position of the coordinate value "1" and the edit command B input in the document edit session 2 212 may be defined as the edit command commanding to delete "c" existing at the position of the coordinate value "2".

In this case, the simultaneous edit performing unit 112 may insert "e" between "a" and "b" according to the edit command A commanding to insert "e" to the position of the coordinate value "1" input in the document edit session 1 211 and perform the first document edit "aebcdefg" for the document edit session 1 211, convert the edit command B commanding to delete "c" existing at the position of the coordinate value "2" input in the document edit session 2 212 into an edit command commanding to delete "c" existing at the position of the coordinate value "3" based on the position change of "aebcdefg" changed according to the edit command A, and then delete "c" from "aebcdefg" based on the converted edit command to generate the first markup language-based document, in which "aebcdefg" is finally edited to "aebdefg".

Simultaneously, the simultaneous edit performing unit 112 may delete "c" from "abcdefg" according to the edit command B commanding to delete "c" existing at the position of the coordinate value "2" input in the document edit session 2 212 and perform the first document edit "abdefg" for the document edit session 2 212, convert the edit command A commanding to insert "e" to the position of the coordinate value " " input in the document edit session 1 211 into an edit command commanding to delete "e" into the position of the coordinate value "1" based on the position change of "abdefg" changed according to the edit command B, and then insert "e" between "a" and "b" based on the converted edit command to generate the first markup language-based document, in which "abdefg" is finally edited to "aebdefg". In this case, even though the edit command B is reflected to the first markup language-based document, but the position on the coordinate, to which the edit command A is to be applied, is not changed, the simultaneous edit performing unit 112 does not separately perform the transformation on the edit command A, but directly reflects the edit command A to the first markup language-based document to generate the first markup language-based document, in which "abcdefg" is edited to "aebdefg", for the document edit session 2 212.

According to the exemplary embodiment of the present invention, the simultaneous edit match verifying apparatus 110 for the markup language-based document may further include a match verification result transmitting unit 115.

The match verification result transmitting unit 115 transmits a result of a match determination for whether the tags of the first markup language-based documents, which are completely edited in the respective n document edit sessions, are matched to each other performed for each of the plurality of edit command sets, and information on the edit command set corresponding to the result of the match determination to a remote issue tracking system 120.

In this case, when the result of the match determination and the information on the edit command set corresponding to the result of the match determination are received, the remote issue tracking system 120 may make the result of the match determination correspond to the information on the edit command set corresponding to the result of the match determination and store the result of the match determination and the information on the edit command set corresponding to the result of the match determination in a management database.

In relation to this, when the match determination is performed on the first markup language-based document for "edit command set 1" among the plurality of edit command sets represented in Table 1, the match verification result transmitting unit 115 may transmit a result of the match determination and information on the "edit command set 1" to the remote issue tracking system 120, and when the match determination is next performed on the first markup language-based document for "edit command set 2", the match verification result transmitting unit 115 may transmit a result of the match determination and information on the "edit command set 2" to the remote issue tracking system 120, such that whenever the match determination is performed on each edit command set, the match verification result transmitting unit 115 may transmit a result of the match determination and information on the corresponding edit command set to the remote issue tracking system 120.

In this case, when the result of the match determination and the information on the edit command set corresponding to the result of the match determination are received, the remote issue tracking system 120 may make the result of the match determination correspond to the information on the edit command set corresponding to the result of the match determination and store the result of the match determination and the information on the edit command set corresponding to the result of the match determination in the management database to support a developer to systemically manage whether it is possible to support the simultaneous edit for each edit command set.

According to the exemplary embodiment of the present invention, when the result of the match determination and the information on the edit command set corresponding to the result of the match determination are received, the remote issue tracking system 120 may make the result of the match determination be correspond to the information on the edit command set corresponding to the result of the match determination and store the result of the match determination and the information on the edit command set corresponding to the result of the match determination in the management database and simultaneously transmit the result of the match determination and the information on the edit command set to the developer, who is a receiver, through a previously registered e-mail address of the developer.

Figure 3:
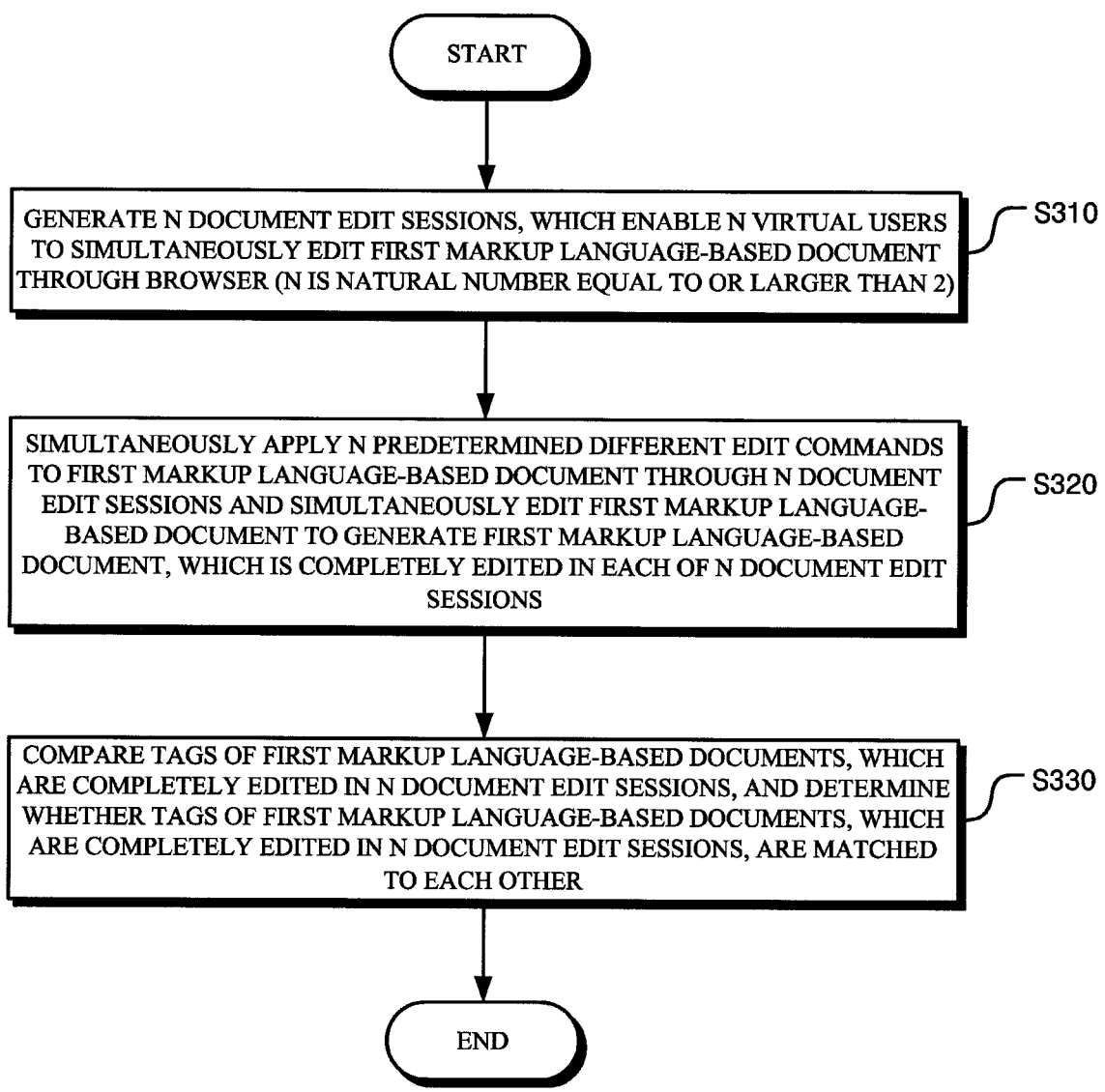
FIG. 3 is a flowchart illustrating a simultaneous edit match verifying method for a markup language-based document according to an exemplary embodiment of the present invention.

FIG. 3 is a flowchart illustrating a simultaneous edit match verifying method for a markup language-based document according to an exemplary embodiment of the present invention.

In operation S310, n document edit sessions, which enable n virtual users to simultaneously edit a first markup language-based document through a browser, are generated (n is a natural number equal to or larger than 2).

In operation S320, the first markup language-based document is simultaneously edited by simultaneously applying predetermined n different edit commands to the first markup language-based document through the n document edit sessions to generate the first markup language-based document, which is completely edited in each of the n document edit sessions.

In operation S330, tags of the first markup language-based documents, which are completely edited in the n document edit sessions, are compared and whether the tags of the first markup language-based documents, which are completely edited in the n document edit sessions, are matched, is determined.

In this case, according to the exemplary embodiment of the present invention, the simultaneous edit match verifying method for the markup language-based document may further include maintaining an edit command set storing unit storing a plurality of edit command sets including n predetermined different edit commands, which are simultaneously applicable from n users for one markup language-based document.

In this case, in operation S320, the first markup language-based document, which is completely edited in each of the n document edit sessions, may be generated by simultaneously applying the n different edit commands included in each of the plurality of command sets to the first markup language-based document through the n document edit sessions and simultaneously editing the first markup language-based document, for each of the plurality of edit command sets, and in operation S330, the tags of the first markup language-based documents, which are completely edited in the n document edit sessions, may be compared and whether the tags of the first markup language-based documents, which are completely edited in the n document edit sessions, are matched to each other may be determined for each of the plurality of edit command sets.

In this case, according to the exemplary embodiment of the present invention, the simultaneous edit match verifying method for the markup language-based document may further include transmitting a result of a match determination for whether the tags of the first markup language-based documents, which are completely edited in the respective n document edit sessions, are matched to each other performed for each of the plurality of edit command sets, and information on the edit command set corresponding to the result of the match determination to a remote issue tracking system.

In this case, when the result of the match determination and the information on the edit command set corresponding to the result of the match determination are received, the remote issue tracking system may make the match determination result be correspond to the information on the edit command set corresponding to the result of the match determination and store the result of the match determination and the information on the edit command set corresponding to the result of the match determination in a management database.

According to the exemplary embodiment of the present invention, in operation S320, for each of the n document edit sessions, the first markup language-based document, which is completely edited in each of the n document edit sessions, may be generated by performing an operational transformation for simultaneously reflecting the n different edit commands included in each of the plurality of edit command sets to the first markup language-based document.

In this case, according to the exemplary embodiment of the present invention, in operation S320, the first markup language-based document, which is completely edited in each of the n document edit sessions, may be generated by first reflecting a first edit command input through a document edit session of the first edit command among the n different edit commands included in each of the plurality of edit command sets to the first markup language-based document and performing a first document edit for each of the n document edit sessions, converting a position in the first markup language-based document, to which the remaining edit commands input through other document edit sessions are to be applied, based on a change in a position of one or more objects existing in the first markup language-based document changed according to the first edit command, and then reflecting the remaining edit commands to the first markup language-based document, of which the first document edit is completed, according to the changed position.

In the above, the simultaneous edit match verifying method for the markup language-based document according to the exemplary embodiment of the present invention has been described with reference to FIG. 3. Here, the simultaneous edit match verifying method for the markup language-based document according to the exemplary embodiment of the present invention may correspond to the configuration of the operation of the simultaneous edit match verifying apparatus 110 for the markup language-based document described with reference to FIGS. 1 and 2, so that a more detailed description thereof will be omitted.

The simultaneous edit match verifying method for the markup language-based document according to the exemplary embodiment of the present invention may be implemented by a computer program stored in a storage medium for executing the method through a cooperation with a computer.

The simultaneous edit match verifying method for the markup language-based document according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, limited embodiments, and drawings, such as a specific constituent element, but these are provided for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. An apparatus for testing a simultaneous edit match for a markup language-based document, the apparatus comprising:
   a display device configured to display predetermined information;
   a storage device configured to store N predetermined different edit commands for altering substance of an original markup language-based document; and
   a processor configured to:
      generate N document edit sessions for editing the original document and assign the N document edit sessions only to a module in the processor of a testing apparatus to be processed by the module, wherein N is a natural number greater than or equal to 2;
      simultaneously display the N document edit sessions on the display device of the testing apparatus to simultaneously edit the original document in the N document edit sessions, the displayed N document edit sessions being separated from each other;
      generate N different command sets which include same edit commands with different orders, respectively;
      simultaneously apply the N command sets to the N document edit sessions, respectively, to generate N edited documents through the N document edit sessions;

determine validity of the N command sets by comparing tags of the N edited documents and determining whether the tags of the N edited documents are matched to each other, wherein N is the same number in the every instance; and transmit a result of match determination with regard to tags of the N edited documents to a remote issue tracking system, wherein when the result of the match determination is received, the remote issue tracking system stores the result of the match determination in a management database and transmits the result of the match determination to a developer of the testing apparatus, wherein the processor performs an operational transformation when simultaneously applying the N command sets to the N document edit sessions, respectively, wherein the processor performs the operational transformation in each document edit session by applying a current edit command in the corresponding command set to the original document to generate a first edited document, transforming a next edit command based on a position change of at least one text object resulted from the current edit command, and applying the transformed next edit command to the first edited document to generate a second edited document, and wherein the processor performs the transforming of the next edit command and the applying of the transformed next edit command by changing an original application position of the next edit command to a new application position in the first edited document based on the position change of the at least one text object by the current edit command, and applying the next edit command to the new application position in the first edited document.

2. The apparatus of claim 1, wherein the N document edit sessions are simultaneously presented in an interface of a browser displayed on the display device.

3. A method of testing a simultaneous edit match for a markup language-based document, the method comprising:
storing, in a storage device of a testing apparatus, N predetermined different edit commands for altering substance of an original markup language-based document;
generating N document edit sessions for editing the original document and assigning the N document edit sessions only to a module in a processor of the testing apparatus to be processed by the module, wherein N is a natural number greater than or equal to 2;
simultaneously displaying the N document edit sessions on a display device of the testing apparatus to simultaneously edit the original document in the N document edit sessions, the displayed N document edit sessions being separated from each other;
generating N different command sets which include same edit commands with different orders, respectively;
simultaneously applying the N command sets to the N document edit sessions, respectively, to generate N edited documents through the N document edit sessions;
determining validity of the N command sets by comparing tags of the N edited documents and determining whether the tags of the N edited documents are matched to each other, wherein N is the same number in the every instance; and,
transmitting a result of match determination with regard to tags of the N edited documents to a remote issue tracking system, wherein when the result of the match determination is received, the remote issue tracking system stores the result of the match determination in a management database and transmits the result of the match determination to a developer of the testing apparatus, wherein the generating N edited documents includes performing an operational transformation when simultaneously applying the N command sets to the N document edit sessions, respectively, wherein the operational transformation is performed by applying a current edit command in the corresponding command set to the original document to generate a first edited document, transforming a next edit command based on a position change of at least one text object resulted from the current edit command, and applying the transformed next edit command to the first edited document to generate a second edited document, and wherein the transforming of the next edit command and the applying of the transformed next edit command are performed by changing an original application position of the next edit command to a new application position in the first edited document based on the position change of the at least one text object by the current edit command, and applying the next edit command to the new application position in the first edited document.

4. The method of claim 3, wherein the N document edit sessions are simultaneously presented in an interface of a browser displayed on the display device.

5. A computer readable recording medium in which a program for executing a method of testing a simultaneous edit match for a markup language-based document is recorded, the method comprising:
storing, in a storage device of a testing apparatus, N predetermined different edit commands for altering substance of an original markup language-based document;
generating N document edit sessions for editing the original document and assigning the N document edit sessions only to a module in a processor of the testing apparatus to be processed by the module, wherein N is a natural number greater than or equal to 2;
simultaneously displaying the N document edit sessions on a display device of the testing apparatus to simultaneously edit the original document in the N document edit sessions, the displayed N document edit sessions being separated from each other;
generating N different command sets which include same edit commands with different orders, respectively;
simultaneously applying the N command sets to the N document edit sessions, respectively, to generate N edited documents through the N document edit sessions;
determining validity of the N command sets by comparing tags of the N edited documents and determining whether the tags of the N edited documents are matched to each other, wherein N is the same number in the every instance; and,
transmitting a result of match determination with regard to tags of the N edited documents to a remote issue tracking system, wherein when the result of the match determination is received, the remote issue tracking system stores the result of the match determination in a management database and transmits the result of the match determination to a developer of the testing apparatus, wherein the generating N edited documents includes performing an operational transformation when simultaneously applying the N command sets to the N document edit sessions, respectively, wherein the operational transformation is performed in each document edit session by applying a current edit command in the corresponding command set to the original document to generate a first edited document, transforming a next edit command based on a position change of at least one text object resulted from the current edit command, and applying the transformed next edit command to the first edited document to generate a second edited document, and wherein the transforming of the next edit command and the applying of the transformed next edit command are performed by changing an original application position of the next edit command to a new application position in the first edited document based on the position change of the at least one text object by the current edit command, and applying the next edit command to the new application position in the first edited document.

6. A computer readable recording medium of claim 5, wherein the N document edit sessions are simultaneously presented in an interface of a browser displayed on the display device.

* * * * *